May 14, 1929.  W. C. BUSKE  1,712,548
COFFEE PERCOLATOR
Filed Aug. 29, 1928
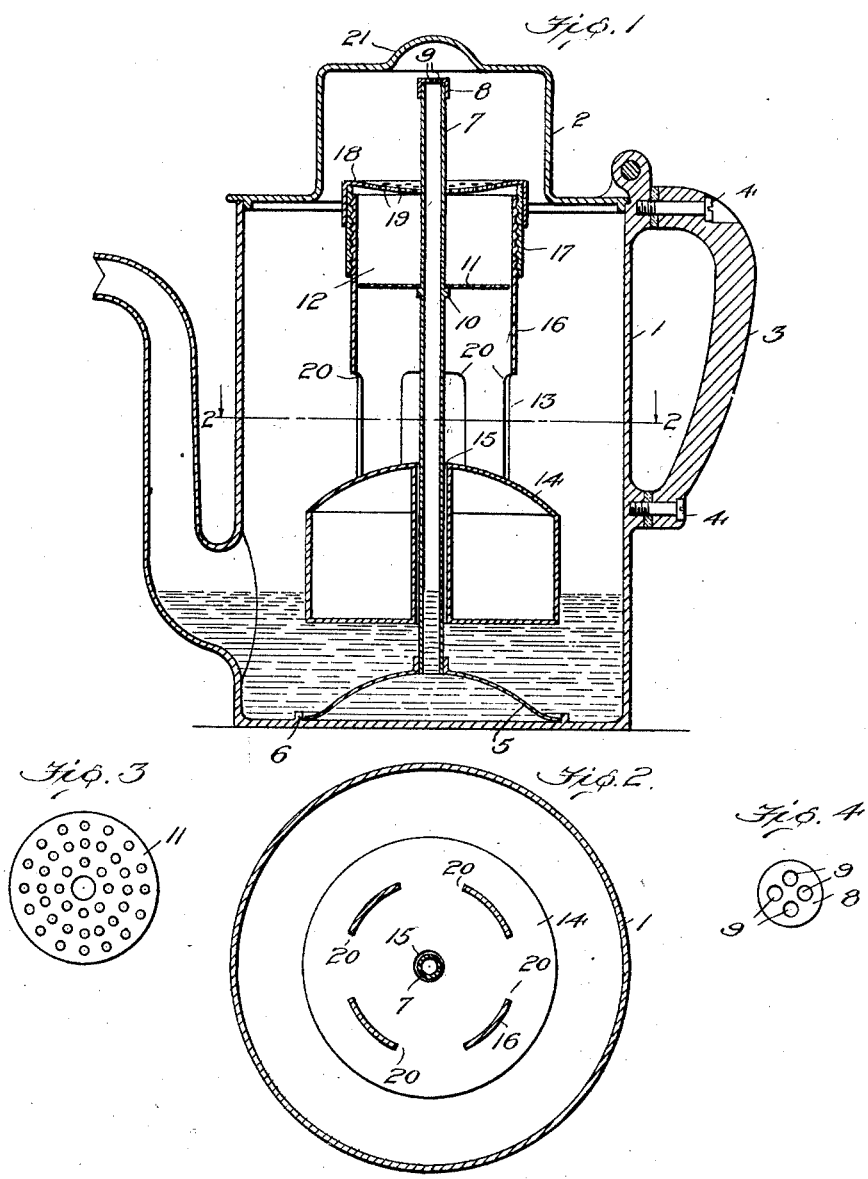

Patented May 14, 1929.

1,712,548

UNITED STATES PATENT OFFICE.

WALTER C. BUSKE, OF PITTSBURGH, PENNSYLVANIA.

COFFEE PERCOLATOR.

Application filed August 29, 1928. Serial No. 302,777.

My invention relates to coffee percolators and has for one of its objects to provide means for automatically varying the capacity of the ground or pulverized coffee receptacle or compartment in accordance with the quantity of liquid in the coffee pot.

A primary feature of the invention consists in providing a coffee percolator with a float for automatically regulating the capacity of the ground coffee compartment.

Another feature of the invention consists in providing a coffee percolator having a ground coffee compartment composed of relatively movable side and bottom portions with means connected to one of said portions for automatically varying the capacity of the compartment according to the quantity of liquid in the percolator.

Other and more specific features of the invention residing in advantageous forms and combinations and constructions of parts will hereinafter appear and be pointed out in the claims.

In the drawings illustrating a preferred embodiment of the invention:

Figure 1 is a longitudinal sectional view of a coffee percolator showing my invention applied thereto.

Figure 2 is a sectional view taken on line 2—2, Figure 1.

Figure 3 is a plan view of the bottom plate of the ground coffee compartment.

Figure 4 is a plan view of the cap of the vapor or steam tube.

In the drawings, 1 indicates the body of the coffee percolator and 2 the top or cover which may be hingedly connected thereto in any convenient manner. The coffee pot is provided with any suitable form of handle 3, the latter being advantageously secured to the body 1 by screws 4.

Resting upon the bottom of the coffee pot is a vapor or steam collector 5 of preferably inverted dish-shape, a flange 6 being advantageously formed rigid with the bottom of the pot for centering the member 5 and preventing transverse movement thereof. Connected to the steam or vapor collector 5 by any suitable means and extending upwardly therefrom is a vapor or steam tube 7 which terminates adjacent the underside of the hinged cover 2. The tube 7 may advantageously be provided with a detachable cap 8 having a plurality of perforations or apertures 9 to permit the vapor or steam to discharge from the tube on to the ground coffee contained in the compartment or receptacle to be hereinafter described.

Intermediate its ends, and preferably somewhat above its central portion, the tube 7 is provided with a lateral projection 10 forming a collar to support a perforated plate 11 constituting the bottom of the ground coffee compartment or receptacle 12. Slidably mounted on the tube 7 is a float member 13, the lower portion of which is formed as an air chamber 14. This chamber is fashioned with a concentric opening or aperture 15 through which the tube 7 extends. The upper portion of the float member 13 consists of a cylindrical extension 16 which, instead of being detachable from the air chamber 14 is preferably made an integral part thereof. The upper end of the cylindrical extension 16 forms the side portion of the ground coffee compartment 12. Thus it will be seen that the effective capacity of the compartment 12 is controlled by the position of the float member 13, the position of the latter member depending upon the quantity of liquid in the coffee pot.

The outer surface of the upper end of the cylindrical extension 16 is threaded to receive a sleeve 17 which, by rotation in the proper direction, may be raised or lowered to vary the capacity of the ground coffee compartment independent of the quantity of liquid in the pot. The compartment 12 may be provided with a removable cap 18, which is slightly concave. The cap, instead of being of wire gauze and the like, may be conveniently provided with a plurality of apertures 19 to permit the steam or vapor issuing from the tube 7 to readily pass into the compartment 12. To enable the liquid dropping from the ground coffee container to be discharged into the main body of the coffee pot the lower portion of the cylindrical extension 16 may be formed with a plurality of openings 20.

The central portion of the hinged cover 2 of the pot may be conveniently concaved, as at 21, to direct the steam or vapor emitting from the tube 7 downwardly on to the cover 18 of the compartment 12.

To properly assemble all of the parts of the coffee percolator the vapor or steam tube 7 is inserted from above into and through the opening 15 in the air chamber 14 of the float and the vapor or steam collector 5 is then mounted on the lower end of the tube 7. The bottom plate 11 of the ground coffee compartment may then be lowered over the tube 7, the sleeve 17 screwed on to the upper end of the cylindrical extension 16, the cap 18 applied to the sleeve and the cap 8 to the upper end of the tube 7. After the parts have been thus assembled they are inserted as a unit into the body and are properly centered therein by the cooperating portions of the vapor or steam collector 5 and the upwardly projecting flange 6.

The following procedure may be used to adjust the percolator to produce a beverage of the desired quality:

A given amount of water is poured into the pot causing an elevation of the float member. The adjusting sleeve 17 is then manipulated so that the compartment 12 will be of a size to receive sufficient ground coffee to make coffee of the desired strength for the water contained in the pot. After the sleeve has been adjusted so that the levelled ground coffee and the upper end of the sleeve coincide, or approximately so, the percolator has been regulated so that a beverage may be produced of the desired strength and no further adjustment is necessary regardless of the amount of beverage to be produced within the capacity of the pot, as the quantity of the water originally placed in the pot automatically controls or regulates the capacity of the ground coffee compartment. All that is necessary, therefore, after once regulating the percolator to produce coffee of the desired strength is to place in the pot a quantity of water equal to the quantity of beverage desired, or a quantity somewhat in excess of that desired, and then fill the ground coffee compartment to its rim. The cover or cap 18 is then applied.

From the foregoing it will be perceived that, although the device comprises a minimum number of parts, which may be easily dismantled when necessary for the purpose of inspection or cleaning, it will efficiently perform its intended function.

I claim:

1. A coffee percolator having a ground coffee compartment, and means controllable by the quantity of liquid in the percolator for automatically varying the capacity of the said compartment.

2. A coffee percolator having a ground coffee compartment, and a float actuated by the liquid in the percolator for automtically regulating the capacity of said compartment.

3. A coffee percolator having a ground coffee compartment, a float actuated by the liquid in the percolator for automatically regulating the capacity of said compartment, and means for varying the capacity of said compartment independently of said float.

4. A coffee percolator having a ground coffee compartment, said compartment comprising relatively movable side and bottom portions, and means connected to one of said portions for automatically varying the capacity of the said compartment according to the quantity of liquid in the percolator.

5. A coffee percolator having a ground coffee compartment, said compartment comprising a relatively immovable bottom portion and relatively movable side portions, and means controllable by the quantity of water in the percolator for actuating said side portions to vary the capacity of said compartment.

6. In a coffee percolator, the combination with an upwardly extending tube, of a ground coffee compartment surrounding said tube, and a float slidably mounted on said tube for regulating the capacity of said compartment.

7. In a coffee percolator, the combination with an upwardly extending tube, of a float slidably mounted thereon, a plate member carried by said tube, and means connected to the float and surrounding said plate member, said means and plate member forming a ground coffee compartment.

8. In a coffee percolator, the combination with an upwardly projecting tube, of a float slidably mounted thereon provided with an upwardly projecting cylindrical extension, and a plate member carried by said tube, the plate member and the upper portion of the cylindrical extension forming a ground coffee compartment, the capacity of said compartment being controlled by the position of said float.

9. In a coffee percolator, the combination with a steam collector, of a tube projecting upwardly therefrom, a ground coffee compartment surrounding said tube, said compartment having a perforated cap, and means operable by the quantity of liquid in the percolator for automatically varying the capacity of said compartment.

In testimony whereof I affix my signature.

WALTER C. BUSKE.